United States Patent [19]
Su

[11] Patent Number: 5,317,487
[45] Date of Patent: May 31, 1994

[54] VEHICLE WARNING LIGHT ASSEMBLY

[76] Inventor: Wu-Shaun Su, No. 79, Chiao-Cheng Rd., Ta-Li Hsiang, Taichung Hsien, Taiwan

[21] Appl. No.: 114,017

[22] Filed: Aug. 30, 1993

[51] Int. Cl.$^5$ ................................................ B60Q 1/26
[52] U.S. Cl. .................... 362/80.1; 362/284; 362/324
[58] Field of Search .............. 362/80.1, 61, 66, 223, 362/282, 284, 322, 324, 35

[56] References Cited

U.S. PATENT DOCUMENTS

| | | | |
|---|---|---|---|
| 4,054,791 | 10/1977 | Du Shane | 362/35 |
| 4,921,429 | 5/1990 | Brown | 362/35 X |
| 4,989,121 | 1/1991 | Hall | 362/80.1 X |

Primary Examiner—Stephen F. Husar
Attorney, Agent, or Firm—Ladas & Parry

[57] ABSTRACT

A vehicle warning light assembly includes an elongated hollow casing having an open front, a lamp unit extending longitudinally between two sides of the casing adjacent to the open front, a wheel member that is mounted rotatably in the casing on one of the two sides of the casing, an elongated reflector plate which is disposed in the casing on one side of the lamp unit and which has one end secured to the wheel member, a driving mechanism which is activatable to rotate the wheel member to rotate correspondingly the reflector plate around the lamp unit, and a transparent pane that is mounted on the casing at the open front of the casing.

4 Claims, 4 Drawing Sheets

VEHICLE WARNING LIGHT ASSEMBLY

BACKGROUND OF THE INVENTION

1. Field Of The Invention

This invention relates to a vehicle warning light assembly, more particularly to a vehicle warning light assembly which generates a light output that is visible at a relatively long distance under heavy fog or rain conditions.

2. Description Of The Related Art

An auxiliary brake light assembly for a vehicle is generally installed at a lower central portion of a rear window of the vehicle and operates when the brake pedal is activated so as to provide a warning signal to the driver of a following vehicle. Conventional auxiliary brake light assemblies generate either a bright constant red light output or a blinking red light output. The light outputs of the conventional auxiliary brake light assemblies can affect the visibility of the drive of the following vehicle due to the strong intensities thereof. Furthermore, the light outputs of the conventional auxiliary brake light assemblies are visible only at a short distance under heavy fog or rain conditions.

SUMMARY OF THE INVENTION

Therefore, the main object of the present invention is to provide a vehicle warning light assembly which generates a light output that is visible at a relatively long distance under heavy fog or rain conditions.

Another object of the present invention is to provide a vehicle warning light assembly which generates a light output that does not affect the visibility of the driver of a following vehicle.

According to this invention, a vehicle warning light assembly includes an elongated hollow casing having an open front, a lamp unit extending longitudinally between two sides of the casing adjacent to the open front, a wheel member that is mounted rotatably in the casing on one of the two sides of the casing, an elongated reflector plate which is disposed in the casing on one side of the lamp unit and which has one end secured to the wheel member, a driving mechanism which is activatable to rotate the wheel member to rotate correspondingly the reflector plate around the lamp unit, and a transparent pane that is mounted on the casing at the open front of the casing.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
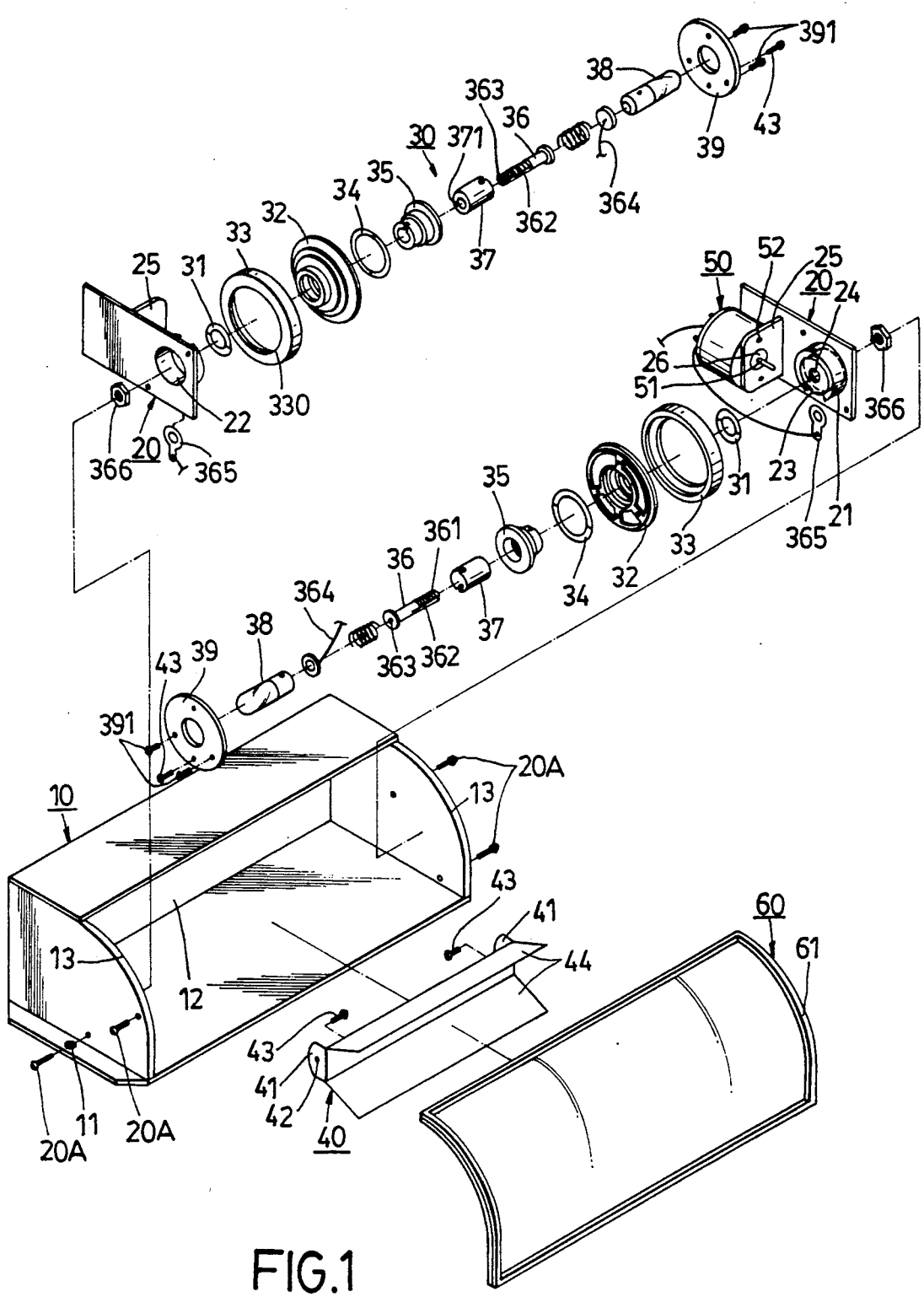
FIG. 1 is an exploded view of a vehicle warning light assembly according to the present invention.
Figure 2:
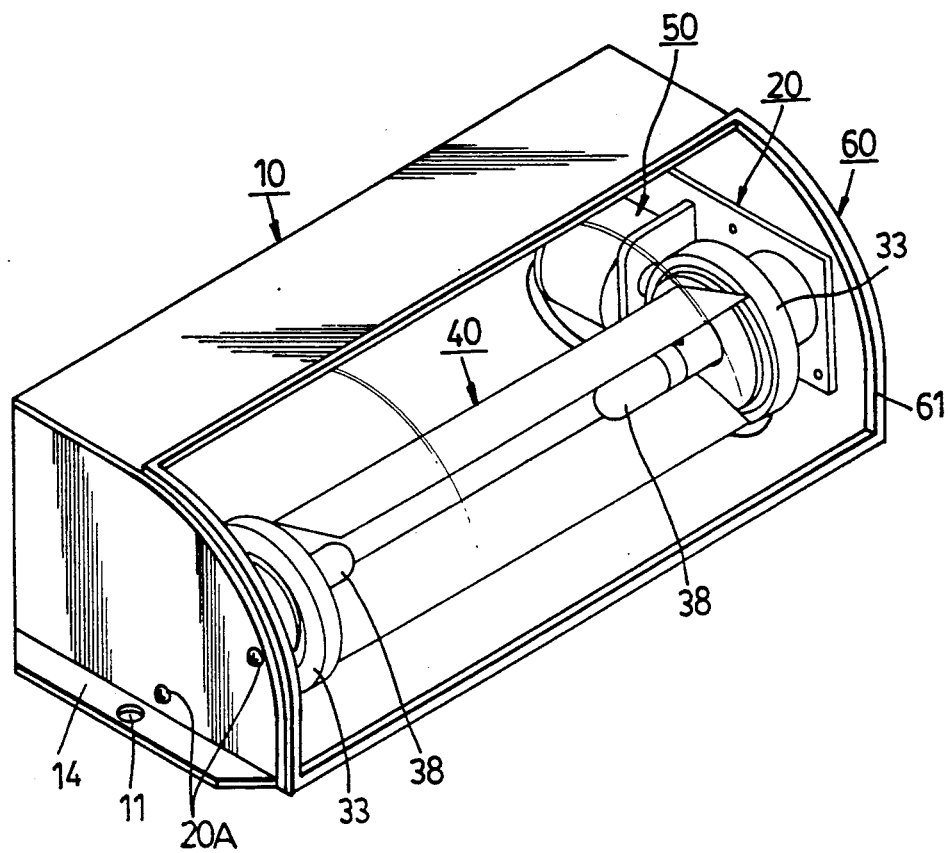
FIG. 2 is a perspective view showing the assembly of the vehicle warning light assembly according to the present invention.
Figure 3:
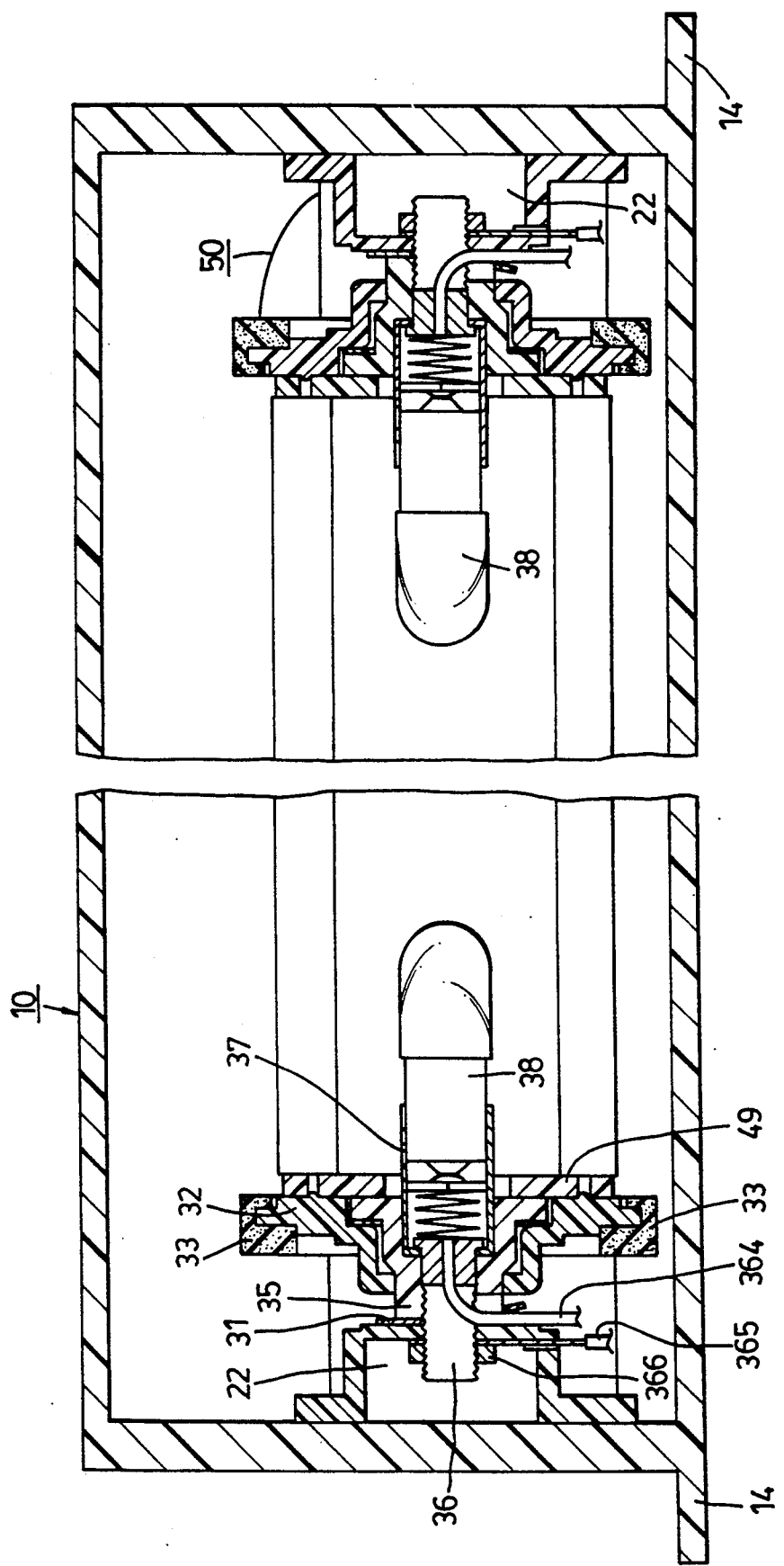
FIG. 3 is a fragmentary sectional view showing the assembly of the vehicle warning light assembly according to the present invention.

Referring to FIGS. 1, 2 and 3, a vehicle warning assembly according to this invention includes an elongated hollow casing 10, two vertical positioning plates 20, two rotating units 30, an elongated reflector plate 40, a driving mechanism 50 and a transparent pane 60.

The elongated hollow casing 10 has an open front 12 and two vertical sides. Each of the two sides of the casing 10 has a curved front edge 13 extending from a top edge to a bottom edge of the casing 10. Two horizontal flanges 14 (only one is shown in FIG. 2) extend outward from the bottom edges of the two sides of the casing 10. Each of the flanges 14 is formed with a locking hole 11.

Each of the vertical positioning plates 20 is mounted on the interior of a corresponding one of the two sides of the casing 10 by extending two locking bolts (20A) through the positioning plate 20 and the corresponding side of the casing 10. Each of the positioning plates 20 has a vertical partition plate 25 extending therefrom so as to divide the positioning plate 20 into a front portion and a rear portion. A through-hole 26 is formed in the central portion of the partition plate 25. A hollow cylindrical projection 21 projects from each positioning plate 20 at the front portion of the latter. Each cylindrical projection 21 defines a recess therein and is formed with an axial hole 24. An axially extending groove 23 is formed in a periphery of the cylindrical projection 21 and is communicated with the recess 22 in the cylindrical projection 21.

The two rotating units 30 are mounted rotatably on the respective positioning plate 20. Each of the rotating units 30 includes a bent first washer 31 provided on the distal end of the cylindrical projection 21. A rubber wheel member 33 is sleeved on a periphery of a disk element 32 and has an annular flange 330 projecting inwardly from an inner periphery thereof. The disk element 32 has an axial hole formed therethrough. A sleeve member 35 has an enlarged annular head portion and a hollow tubular portion extending axially from the head portion. The tubular portion of the sleeve member 35 extends through the axial hole of the disk element 32 to abut against the first washer 31 on the distal end of the cylindrical projection 21. A bent second washer 34 is sleeved on the tubular portion of the sleeve member 35 and is placed between the disk element 32 and the annular head portion of the sleeve member 35. A positioning rod 36 has an externally threaded end portion 361. The end portion 361 of the positioning rod 36 extends through an axial hole 371 in a lamp seat 37 of a lamp unit. An axial bore 363 is formed in the positioning rod 36. A longitudinal groove 362 is formed in a periphery of the positioning rod 36 and is communicated with the axial bore 363 in the positioning rod 36. The lamp unit further includes an elongated light bulb 38 which is received in the lamp seat 37. A first terminal 364 of the lamp unit extends through the longitudinal groove 362 and the axial bore 363 in the positioning rod 36 and is connected electrically to the light bulb 38. The lamp seat 37 extends through the tubular portion of the sleeve member 35 such that the end portion 361 of the positioning rod 36 extends into the recess 22 in the cylindrical projection 21 via the axial hole 24 and is retained in the recess 22 by means of a locking nut 366. A second terminal 365 extends into the recess 22 via the axial groove 23 and is clamped between the end portion 361 of the positioning rod 36 and the locking nut 366. A locking plate 39 is secured to the disk element 32 by means of screws 391 which extend through the locking plate 39 and the disk element 32 so as to prevent disengagement of the disk element 32 from the sleeve member 35. The disk element 32 and the rubber wheel member 33 are synchronously rotatable about the sleeve member 35 and the lamp unit.

The elongated reflector plate 40 is generally C-shaped in cross-section and has two diverging side portions 44. The reflector plate 40 is disposed in the casing 10 on one side of light bulbs 38 of the lamp unit and has two lugs 41 formed at two distal ends thereof parallel to the locking plates 39 of the rotating unit 30. Two axially aligned holes 42 are formed respectively in the lugs 41 of the reflector plate 40. The lugs 41 of the reflector plate 40 are secured respectively to the locking plates 39 by extending locking bolts 43 through the aligned holes 42 in the lugs 41.

The driving mechanism, in the present embodiment, includes a small motor 50 which is installed in the casing 10 beside the rear portion of one of the positioning plates 20 and which is secured to the partition plate 25 by means of fasteners, such as screws 52. The motor 50 has a driving shaft 51 that extends through the through-hole 26 in the partition plate 25. A periphery of the driving shaft 51 is in tight contact with the annular flange 330 of the rubber wheel member 33 that is adjacent to said one of the positioning plates 20.

The transparent pane 60 is mounted adhesively to the casing 10 on the open front 12 of the latter. In the present embodiment, the light bulb 38 generates yellow light although a light bulb, which generates white light, may also be used. If the light bulb that is installed generates white light, the pane 60 is preferably yellow in color. The pane 60 is preferably provided with an endless rubber member 61 at a periphery thereof.

Figure 4:
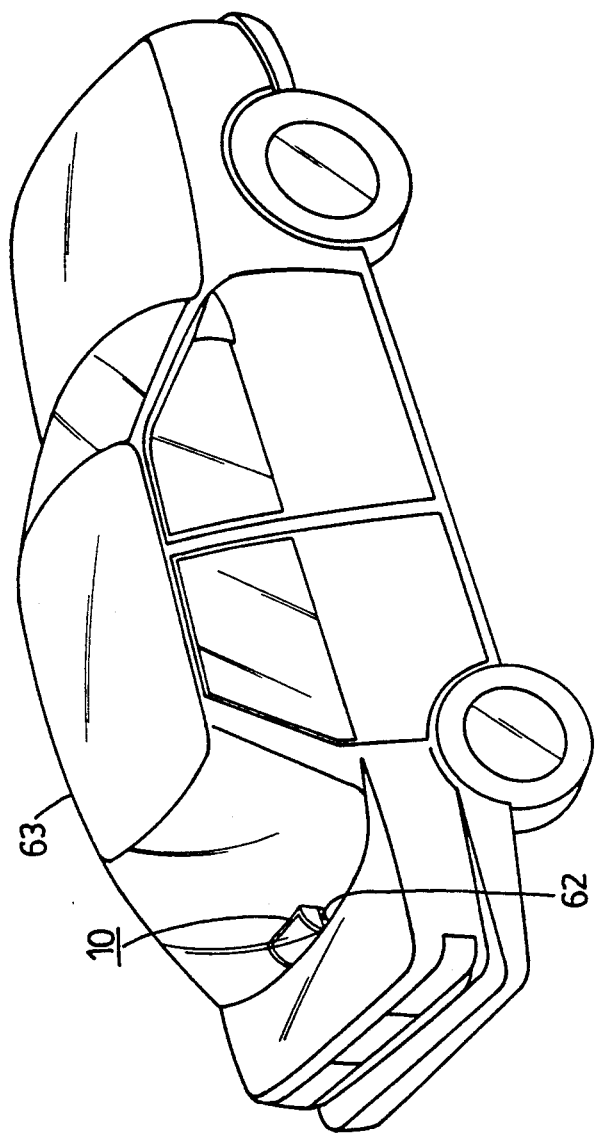
FIG. 4 is a schematic view showing the vehicle warning light assembly when installed in a vehicle.

Referring now to FIG. 4, the assembled vehicle warning light assembly is fixed in a vehicle 63 at a lower central portion of the rear window by extending screws 62 through the locking holes 11 in the flanges 14 of the casing 10 (see FIGS. 1 and 2).

The vehicle warning light assembly according to the present invention may be activated by the brake pedal (not shown) or the handbrake lever (not shown) of the vehicle. In operation, when the brake pedal or the handbrake lever is operated, the motor 50 is activated to rotate the driving shaft 51, while the lamp unit is activated to generate a light output. Since the periphery of the driving shaft 51 is in contact with the annular flange 330 of the rubber wheel member 33, the wheel member 33 rotates such that the reflector plate 40 is rotated around the lamp unit. In the present embodiment, the reflector plate 40 is rotated at a speed of about two revolutions per second. The fan-shaped beam of yellow light that is reflected by the reflector plate 40 does not affect the visibility of the driver of a following vehicle and is visible at a relatively long distance even during heavy fog or rain conditions.

The rubber wheel member 33 may be replaced by a toothed wheel member (not shown) which is coupled rotatably with the driving shaft 51. Furthermore, the rotating units 30 may be mounted rotatably on the positioning plates 20 by means of bearings.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A vehicle warning light assembly, comprising:
   an elongated hollow casing having an open front;
   a lamp unit extending longitudinally between two sides of said casing adjacent to said open front;
   a wheel member mounted rotatably in said casing on one of said two sides of said casing;
   an elongated reflector plate disposed in said casing on one side of said lamp unit, said reflector plate having one end secured to said wheel member;
   a driving mechanism activatable to rotate said wheel member and rotate correspondingly said reflector plate around said lamp unit; and
   a transparent pane mounted on said casing at said open front of said casing.

2. A vehicle warning light assembly as claimed in claim 1, wherein said driving mechanism includes a motor which is installed in said casing and which has a driving shaft coupled with said wheel member.

3. A vehicle warning light assembly as claimed in claim 1, wherein said pane is yellow in color and said lamp unit generates white light.

4. A vehicle warning light assembly as claimed in claim 1, wherein said lamp unit generates yellow light.

* * * * *